UNITED STATES PATENT OFFICE.

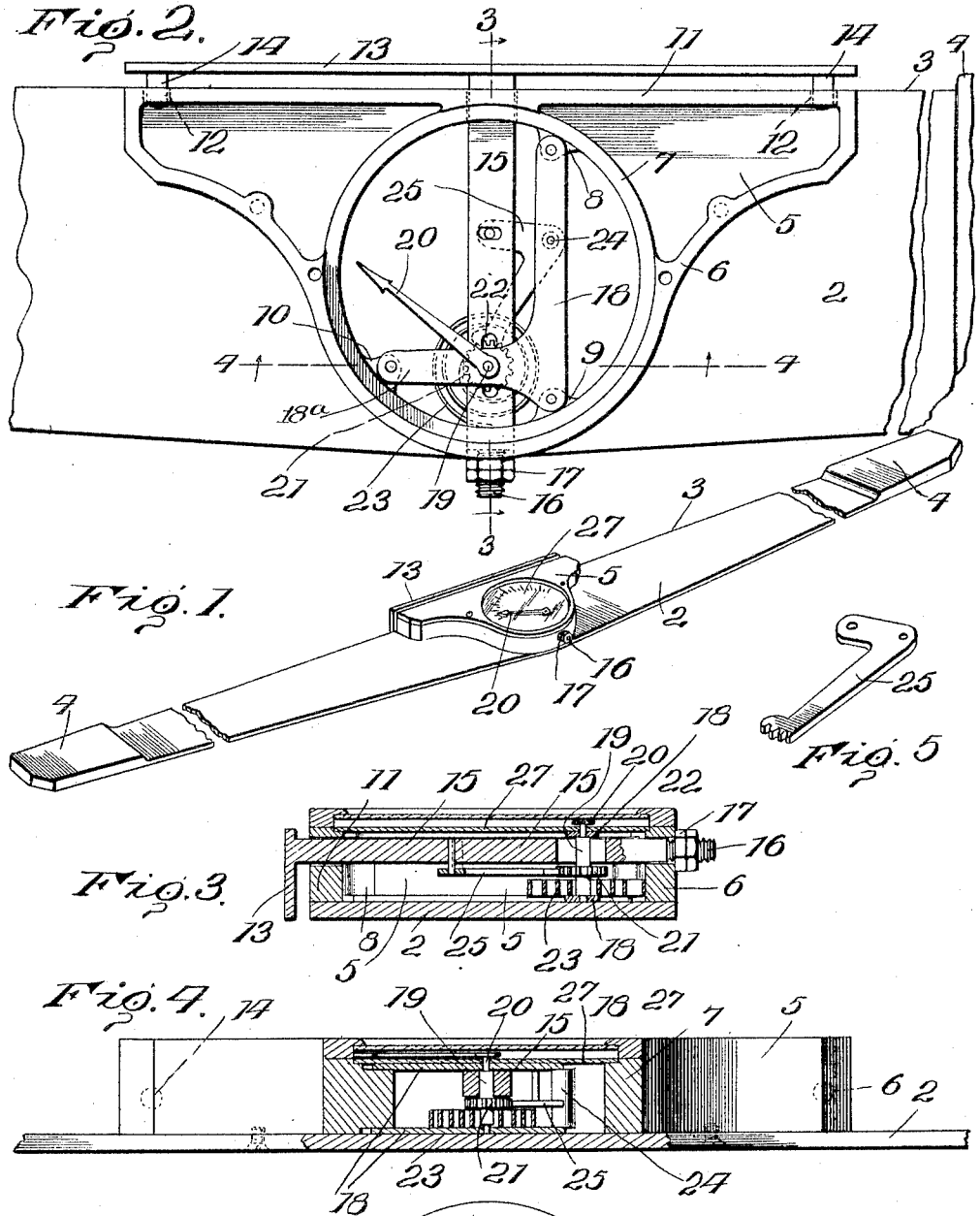

EDWIN C. WIDEMIRE, OF WINTERBURN, WEST VIRGINIA.

MICROMETER BACK-GAGE FOR BAND-SAWS.

1,116,656.

Specification of Letters Patent.   Patented Nov. 10, 1914.

Application filed July 21, 1913.   Serial No. 780,307.

*To all whom it may concern:*

Be it known that I, EDWIN C. WIDEMIRE, citizen of the United States, residing at Winterburn, in the county of Pocahontas and State of West Virginia, have invented certain new and useful Improvements in Micrometric Back-Gages for Band-Saws, of which the following is a specification.

My invention relates to gages, and particularly to gages used for determining any variation from a straight line in the back edges of band saws.

In fitting band saws for service in lumber mills or for re-sawing in planing mills, box factories, etc., there are three essential processes requiring close and careful work in order to secure the best service from the saw. The first of these is leveling, or freeing the saw plate of all lumps, twists and ridges. The second process is the equalizing of the tensioning or opening of the plate. The third process is the truing of the edge of the saw plate either to a straight line or to a certain convexity. While these processes are all carried on together, the last process is the most difficult of all, requiring the most care, and it is for the purpose of applying this condition or test that my improved micrometric gage is designed, and to provide means whereby the saw sharpener may judge how best to relieve the edge bending stresses set up in the saw blade by the grinding of the teeth, as well as those caused by accidents to the saw while in service.

In general practice a solid gage is used, usually five feet in length, and as it is almost universal practice at the present time to make the saw blades a little longer on the back than on the front or cutting edge, that is, to make the back slightly convex, these solid gages are made concave from one-sixty-fourth of an inch to one-thirty-second in the five foot length of the gage.

Since saws vary in length from twenty-five feet or less in small resaws to sixty-five feet in the large mills, it is readily seen that any error made in a single test with the back gage is magnified a great many times in the length of the saw, and such errors cause the saw to oscillate when in motion on the machine, thus not only lowering the efficiency of the saw but rendering it liable to crack.

The primary object of my invention as before stated is the provision of a gage whereby to determine any variation from a straight line in the back edge of a band saw.

A further object of the invention is to so construct the gage that any variation from a straight line in the saw back will be magnified to a considerable extent upon the gage, thus making it easy to read any minute variations.

A further object of the invention is the provision of a gage having a standard length adapted to bear at its opposite ends against the rear edge of the saw blade and having a movable gage plate disposed at its middle and operating a pointer whereby the movement of the movable gage plate relative to a line extending between the ends of the gage may be plainly indicated.

A further object of the invention is the provision of a gage of the character stated which will indicate not only a concavity of the back of the saw blade but a convexity of this back, thus automatically indicating whether the back is "hollow," "crowned," "convex" or "concave" and to what extent.

A further object is the provision of a gage of extremely simple construction, not easily gotten out of order and in which the movable gage plate is resiliently urged against the work.

My invention is illustrated in the accompanying drawings wherein:

Figure 1 is a perspective view of my improved micrometric gage. Fig. 2 is an enlarged plan view nearly full size of the middle portion of the gage. Fig. 3 is a section on the line 3—3 of Fig. 2. Fig. 4 is a section on the line 4—4 of Fig. 2. Fig. 5 is a perspective detail view of the lever whereby motion is transmitted to the pointer actuating pinion. Fig. 6 is a fragmentary face view of the dial.

Corresponding and like parts are referred to in the following description and indicated in all the views of the accompanying drawings by the same reference characters.

Referring to these drawings, 2 designates the straight edge which comprises a plate about five feet in length. The middle portion of this plate is cut away as at 3, thus leaving the two edge projections 4 which in practice bear against the back of the saw, and which are of double thickness so as to aid the operator when application is made against the points of the teeth in double cutting saws. This is a decided advantage in this class of work and by reason of it the gage is made universal in its adaptation to all classes of band saw work.

Mounted upon the face of the gage plate 2 or straight edge is a casing 5 which may be of any suitable form and is rigidly attached to the plate 2. The frame 6 of this casing is formed with a central annular portion 7 which has the inwardly projecting lugs 8, 9 and 10 on its inner face, the lugs 8 and 9 being arranged both in a line parallel to a line extending through the center of the annular member 7 coincident with the middle of the plate 2. The frame also includes a longitudinally extending member 11 the edge of which is flush with the edge of the plate 2 and which is perforated as at 12 at each end.

Disposed parallel to the member 11 and the edge face of the plate 2 is a shiftable gage plate 13 formed at its ends with the inwardly projecting studs 14 which extend into the guide holes 12 formed in the member 11. The middle of this plate is formed with an inwardly extending arm 15. The extremity of this arm is screw threaded and carries a nut 17 which bears against the exterior of casing 5 whereby the arm may be drawn inward to adjust the plate 13, the end of the screw forming a stop limiting the outward movement of the arm 15 of the plate 13.

Disposed within the annular member 7 is an angular supporting member 18 which is riveted or otherwise attached to the lug 8, the lug 9 and the lug 10. The laterally extending arm 18$^a$ of this angular member extends above the arm 15. Mounted between this angular member 18 and the bottom of the casing 5 is a vertical shaft or pivot pin 19, to the upper end of which is attached a pointer 20 operating upon the face of the casing 5, and mounted upon this shaft 19 and rotatable therewith is a pinion 21. The arm 15 is slotted as at 22 to permit the passage of the shaft 19 and permit a movement of the arm 15 independent of the shaft. A coil spring 23 is rigidly mounted at one end to the casing and its other end is attached to the shaft 19, this coil spring resisting any rotation of the shaft in one direction and acting to bring the shaft back to a position with the pointer at zero.

Pivotally connected to the support 18 by means of a pin 24 which extends down through the support 18 and into the bottom of the casing is an angular lever 25. One arm of this lever is pivoted at its extremity to the arm 15 while the free end of the lever is formed with an arcuate toothed face 26, the teeth on this face engaging with the pinion 21. The arm 15 is transversely slotted to receive the pivot pin of the angular lever 26 and accommodate the slight arc described by this pivot pin. It will thus be obvious that any movement of the pinion 21 will be transferred to the lever 25 and that any movement of the plate 13 and of the arm 15 will be transmitted to the angular lever and thus to the pinion, rotating the pinion and shifting the pointer over the dial. The face of the casing 5 is formed with a dial 27 over which the pointer moves.

With the construction as previously described, any movement of the gage plate 13 is transmitted to the pointer 20 and is magnified by the pointer 20 about twenty-four times. In other words, 1/256 of an inch is shown on the dial by the indicator hand moving somewhat more than 1/12 of an inch, thus making it easy to read any minute variation. The face plate 13 has a movement of 1/8 of an inch or 1/16 of an inch from the exact straight line tangent to projections 4 and this will allow an accurate measurement of convexity from a straight line to 1/16 of an inch in the length of the gage and indicate any error of like amount either way from a straight line. Thus if the back is convex such convexity will be indicated by a movement of the pointer in one direction, while if the back is concave such concavity will be indicated by a movement of the pointer in the opposite direction. By adjusting the nut 17 it is possible to very delicately adjust the gage to the curvature of the saw back so that exact measurements may be obtained whereby the saw sharpener may judge where and how the compressing rolls may be applied to adequately relieve the stresses to which the saw has been subjected by grinding. It may be pointed out that the gage plate 13 is so supported that it is at all times parallel to the edge of the straight edge or plate 2. The gage plate is not allowed to tip both because it is supported by means of the pins 14 moving in the guide openings 12 and because the arm 15 is slotted and engages the pivot pin or shaft 19 so that while the arm 15 may move inward in a straight line it can not rock. The amplification of the movement of the gage plate 13 is secured by making one arm of the lever 25 longer than the other arm and providing the arcuate toothed face which will engage with the pinion. Any movement of the short arm of the lever is thus amplified in the longer arm and this is in turn amplified by the proportion of the toothed face of the lever to the pinion with which it operates.

It will be seen that my invention is very simple, that it is very accurate, that it magnifies any error so that the error may be readily observable, and that it will respond to any variation in the back of the saw as the saw is moved along the gage 2 or the gage moved along the back of the saw. While I have particularly designed my gage for use in measuring the variations from a straight line in the back of the saw, I wish it understood that it may be used for any other purpose for which it is adapted, and that the principles of the invention may be particularly applied to all gages used as tension gages in band or circular saw work.

The nut 17 on the end of the arm 15 is primarily intended as a stop and as such will avoid accidents to the smaller working parts better than if a pin stop were used on the face of the dial engaging with the pointer 20. Furthermore, when the gage is used to test convex or "crowned" back saws, the indicator hand may be adjusted to the straight line mark and thus use the shorter movement of the face plate which is all that is desirable in this class of work.

It is particularly pointed out that this gage is not a fixed gage but is movable along the edge of the saw. In the manufacture of lumber the automatic handling of heavy timbers and logs causes a great deal of vibration to the building. In many cases the building is not rigid enough to keep this vibration down to a minimum and as many of the filing rooms where the saws are fitted for use in the mill are a story above the sawing floor, this vibration is increased rather than diminished. Under such conditions the testing of heavy saw plates by handling the same against stationary stops is not only a very laborious and difficult operation, but it is practically impossible to ascertain minute variations. A further objectionable feature of stationary stops is that the operator is obliged to work with the teeth of the saw toward him at all times. This can not be avoided in double cutting saws but this constitutes a very small percentage of the aggregate. By the use of my invention this objection is avoided wherever possible. It will be obvious that under these conditions it is most reasonable and logical to use some tool or gage that is convenient to handle to test the work rather than handle the object itself against such a tool or gage. My gage is particularly adapted for this purpose and is also particularly adapted to be used as a tension gage for either circular or band saw work.

What I claim is:

1. A gage of the character described comprising a straight edge, a casing mounted upon the straight edge, a dial on the casing, a shaft passing through the dial, a pointer on the shaft, a pinion on the shaft, a spring engaging the shaft to resist a rotation in one direction, an angular lever mounted within the casing, said lever being pivoted at the intersection of its angular arms, one end of the lever being toothed and engaging the pinion on the shaft, a movable gage plate mounted upon the face of the casing and parallel to the straight edge, and an arm extending inward from the gage plate and pivotally connected to one end of said lever.

2. A gage of the character described comprising a straight edge, a casing disposed at the middle of the straight edge and having one face thereof coincident with the edge of the straight edge and perforated at opposite ends, a gage plate having guide pins extending into said perforations and an arm extending from the middle of the gage plate, a dial mounted upon the casing, a shaft mounted therein, a pointer on the shaft moving over the dial, a pinion on the shaft, an angular lever pivoted at the intersection of its arms within said casing, one arm of said lever being pivoted to the inwardly extending arm of the gage plate and the other arm being formed with a toothed face engaging the pinion, and a spring resisting the rotation of the shaft in one direction and urging said shaft in a direction to cause the outward movement of the gage plate.

3. A gage of the character described comprising a straight edge with a casing carried thereby, a movable gage-plate carried upon the straight edge and extending parallel thereto, an arm extending from the gage-plate through the casing at a plurality of points, an index pointer, a dial over which it moves, and means operatively connecting the arm with the gage-plate and increasing the ratio of movement of the pointer with relation to said arm.

4. A gage of the character described comprising a straight edge, a casing mounted upon the straight edge, a dial on the casing, a shaft passing through the dial, a pointer mounted on the shaft, a spring engaging the shaft to resist the rotation in one direction, a movable gage-plate carried upon the straight edge and extending parallel thereto, an arm extending from the gage-plate through the casing at a plurality of points, a pinion on the shaft, and means operatively connected to said arm and engaging said pinion whereby a movement of the arm will cause a rotation of the pinion.

5. A gage of the character described comprising a straight edge, a casing mounted thereon, a movable gage-plate mounted on the straight edge and extending parallel thereto, an arm extending from the gage-plate and entirely through the casing and being thereby supported by the casing at a plurality of points, a pointer, means operatively connecting the pointer with said arm to cause a rotation of the pointer upon a movement of the arm, and adjustable means on said arm and engaging the casing for limiting the outward movement of the arm and gage-plate.

6. A gage comprising a straight edge, a casing formed therewith, a movable gage-plate carried upon the straight edge and extending parallel thereto, an arm extending inward from the gage-plate and fixed thereto and passing through the wall of the casing at two points to thereby provide a plurality of bearings for said arm, the extremity of the arm being screw-threaded, an adjusting nut on the extremity of the arm adapted to contact with the exterior face of the casing and limit the movement of the arm in one direction, a rotatable pointer mounted upon the casing, a dial co-acting therewith, means operatively connecting the arm with said pointer to cause rotation of the latter upon a movement of the former, and means urging the arm in a direction to force the gage-plate outward away from the straight edge.

7. A gage of the character described comprising a straight edge, a casing disposed at the middle of the straight edge and having one face thereof co-incident with the edge of the straight edge, a gage-plate extending parallel to the straight edge and having guiding members operatively engaging the ends of the casing, an arm extending inward from the gage-plate and passing entirely through the casing and being supported thereby at a plurality of points, a dial on the casing, a shaft in the casing, a pointer mounted on the shaft and co-acting with the dial on the casing, a shaft in the casing, a pointer mounted on the shaft and coacting with the dial, a pinion on the shaft, a spring resisting the movement of the shaft in one direction, and an angular lever pivoted intermediate its ends to a fixed support, one end of said lever being pivotally connected to said arm and the other end of the lever being formed with a sector gear inclosing said pinion.

In testimony whereof I affix my signature in presence of two witnesses.

EDWIN C. WIDEMIRE. [L. S.]

Witnesses:
 GEO. W. D. HEBBERT,
 LLOYD SMITH.

Copies of this patent may be obtained for five cents each, by addressing the "Commissioner of Patents, Washington, D. C."